(12) United States Patent
Makino et al.

(10) Patent No.: US 8,860,859 B2
(45) Date of Patent: Oct. 14, 2014

(54) IMAGING APPARATUS, COMPUTER READABLE MEDIUM AND IMAGING METHOD

(75) Inventors: Kazuhiro Makino, Kanagawa (JP); Jun Takaba, Kanagawa (JP); Yasutake Tanaka, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 151 days.

(21) Appl. No.: 13/594,329

(22) Filed: Aug. 24, 2012

(65) Prior Publication Data

US 2013/0083206 A1   Apr. 4, 2013

(30) Foreign Application Priority Data

Sep. 29, 2011  (JP) ................................. 2011-214705

(51) Int. Cl.
*H04N 5/335* (2011.01)
*H04N 5/372* (2011.01)
*H04N 5/357* (2011.01)
*H04N 5/347* (2011.01)
*H04N 5/378* (2011.01)

(52) U.S. Cl.
CPC ............ *H04N 5/37213* (2013.01); *H04N 5/357* (2013.01); *H04N 5/347* (2013.01); *H04N 5/378* (2013.01)
USPC .......................................... 348/296; 348/308

(58) Field of Classification Search
CPC ........... H04N 5/04; H04N 5/06; H04N 5/357; H04N 5/3575
USPC ........................... 348/294, 296, 302, 308, 312
See application file for complete search history.

(56) References Cited

U.S. PATENT DOCUMENTS

| 5,946,033 A | 8/1999 | Mooney et al. |
| 8,098,314 B2 * | 1/2012 | Mandelli ....................... 348/308 |

(Continued)

FOREIGN PATENT DOCUMENTS

| EP | 2560374 A1 | 2/2013 |
| JP | 10-191168 A | 7/1998 |

(Continued)

OTHER PUBLICATIONS

Notice of Reasons for Rejection issued by the Japanese Patent Office (JPO) on Aug. 20, 2013, in Japanese Patent Application No. 2011-214705.
Office Action issued by the European Patent Office on Jul. 16, 2014, in European Application No. 12181183.0.

*Primary Examiner* — Timothy J Henn
(74) *Attorney, Agent, or Firm* — Jean C. Edwards, Esq.; Edwards Neils PLLC (57) ABSTRACT

An imaging apparatus is provided with a control unit, a noise reduction processing unit and a pixel value calculation unit. The control unit controls pulse widths of horizontal synchronization signals outputted to an imaging device such that a feed-through period and a signal period, in a case in which pixel addition in the horizontal direction is performed at the imaging device and imaging signals are outputted, are longer than a feed-through period and a signal period, in a case in which pixel addition in the horizontal direction is not performed at the imaging device. The noise reduction processing unit executes noise reduction processing to reduce the effects of noise produced in the imaging signals. The pixel value calculation unit calculates a pixel value on the basis of a first signal sampled in the feed-through period and a second signal sampled in the signal period.

19 Claims, 7 Drawing Sheets

(56) References Cited

U.S. PATENT DOCUMENTS

| | | |
|---|---|---|
| 2002/0118291 A1 | 8/2002 | Ishigami et al. |
| 2008/0062286 A1* | 3/2008 | Beck .............................. 348/241 |
| 2008/0122962 A1* | 5/2008 | Shah ............................. 348/308 |
| 2008/0218620 A1* | 9/2008 | Atlas et al. ..................... 348/308 |
| 2008/0266423 A1* | 10/2008 | Yamaguchi .............. 348/231.99 |
| 2009/0219058 A1 | 9/2009 | Ohba |

FOREIGN PATENT DOCUMENTS

| | | |
|---|---|---|
| JP | 10-191169 A | 7/1998 |
| JP | 2001258053 A | 9/2001 |
| JP | 4015242 A | 11/2007 |
| JP | 2008053907 A | 3/2008 |
| JP | 2008199164 A | 8/2008 |
| JP | 2008252420 A | 10/2008 |

\* cited by examiner

FIG. 7A
RESET SIGNAL

FIG. 7B
HORIZONTAL
SYNCHRONIZATION
SIGNAL H1

HORIZONTAL
SYNCHRONIZATION
SIGNAL H2

FIG. 7C
IMAGING SIGNAL

FIG. 7D
SAMPLING SIGNAL

IMAGING APPARATUS, COMPUTER READABLE MEDIUM AND IMAGING METHOD

CROSS-REFERENCE TO RELATED APPLICATIONS

This application claims priority under 35 USC 119 from Japanese Patent Application No. 2011-214705 filed on Sep. 29, 2011, the disclosure of which is incorporated by reference herein.

BACKGROUND OF THE INVENTION

1. Field of the Invention

The present invention relates to an imaging apparatus, a computer readable medium storing an imaging program, and an imaging method.

2. Description of the Related Art

Heretofore, among imaging apparatuses that use imaging devices such as CCDs and the like, a variety of imaging apparatuses have been proposed that may perform imaging with improved sensitivity by pixel addition (binning). Various technologies have also been proposed that reduce random noise by multiple sampling of imaging signals.

For example, Japanese Patent Application Laid-Open (JP-A) No. 10-191169 has disclosed a technology that improves a signal-to-noise ratio by plurally sampling both a feed-through level and a signal level from the output of a charge transfer device and taking differences between results of the plural samples of the feed-through level and results of the plural samples of the signal level.

JP-A No. 10-191168 has disclosed a technology that realizes a high image quality CCD imaging device that may reliably assure a correlated double sampling period and perform sampling, and shorten a horizontal scan period, accelerate automatic control feedback and monitor outputs, and increase a pixel count.

Japanese Patent No. 4,015,242 has disclosed a technology that may read out an image during binning with a high scan speed and a high signal-to-noise ratio, by, when binning operations are being performed in a horizontal direction, making a charge transfer speed in a period of adding accumulated charges of plural adjacent pixels faster than a charge transfer speed outside this period.

If a multiple sampling number is increased, an analog-to-digital (A/D) converter that A/D-converts imaging signals at a higher speed than when multiple sampling is not performed is necessary. If a low-speed A/D converter is used, the frame rate decreases and low frequency noise (for example, 1/f noise) becomes obvious.

SUMMARY OF THE INVENTION

The present invention has been made in view of the above circumstances and provides an imaging apparatus, a computer readable storage medium storing an imaging program and an imaging method.

According to an aspect of the invention, there is provided an imaging apparatus including: an imaging device that images an imaging subject, pixels of the imaging device being arrayed in two dimensions and the imaging device being equipped with a pixel addition function that performs pixel addition of a plurality of pixels in a horizontal direction; a control unit that controls a pulse width of horizontal synchronization signals outputted to the imaging device, such that a feed-through period and a signal period, in a case in which pixel addition in the horizontal direction is performed at the imaging device and imaging signals are outputted, are longer than a feed-through period and a signal period, in a case in which pixel addition in the horizontal direction is not performed at the imaging device; a noise reduction processing unit that executes noise reduction processing, which utilizes the fact of the feed-through period and the signal period, in the case in which pixel addition in the horizontal direction is performed, being longer than the feed-through period and the signal period, in the case in which pixel addition in the horizontal direction is not performed, to reduce effects of noise produced in the imaging signals; and a pixel value calculation unit that calculates a pixel value on the basis of a first signal sampled in the feed-through period, and a second signal sampled in the signal period.

According to an aspect of the invention, there is provided a non-transitory computer readable medium storing a program causing a computer to execute image processing, the image processing including: controlling a pulse width of horizontal synchronization signals outputted to an imaging device that images an imaging subject, pixels of the imaging device being arrayed in two dimensions and the imaging device being equipped with a pixel addition function that performs pixel addition of a plurality of pixels in a horizontal direction, such that a feed-through period and a signal period, in a case in which pixel addition in the horizontal direction is performed at the imaging device and imaging signals are outputted, are longer than a feed-through period and a signal period, in a case in which pixel addition in the horizontal direction is not performed at the imaging device; executing noise reduction processing, which utilizes the fact of the feed-through period and the signal period, in the case in which pixel addition in the horizontal direction is performed, being longer than the feed-through period and the signal period, in the case in which pixel addition in the horizontal direction is not performed, to reduce effects of noise produced in the imaging signals; and calculating a pixel value on the basis of a first signal sampled in the feed-through period, and a second signal sampled in the signal period.

According to an aspect of the invention, there is provided an imaging method including: controlling a pulse width of horizontal synchronization signals outputted to an imaging device that images an imaging subject, pixels of the imaging device being arrayed in two dimensions and the imaging device being equipped with a pixel addition function that performs pixel addition of a plurality of pixels in a horizontal direction, such that a feed-through period and a signal period, in a case in which pixel addition in the horizontal direction is performed at the imaging device and imaging signals are outputted, are longer than a feed-through period and a signal period, in a case in which pixel addition in the horizontal direction is not performed at the imaging device; executing noise reduction processing, which utilizes the fact of the feed-through period and the signal period, in the case in which pixel addition in the horizontal direction is performed, being longer than the feed-through period and the signal period, in the case in which pixel addition in the horizontal direction is not performed, to reduce effects of noise produced in the imaging signals; and calculating a pixel value on the basis of a first signal sampled in the feed-through period and a second signal sampled in the signal period.

BRIEF DESCRIPTION OF THE DRAWINGS

Preferred embodiments of the present invention will be described in detail based on the following figures, wherein.

DETAILED DESCRIPTION OF THE INVENTION

Herebelow, an exemplary embodiment of the present invention is described with reference to the attached drawings.

Figure 1:
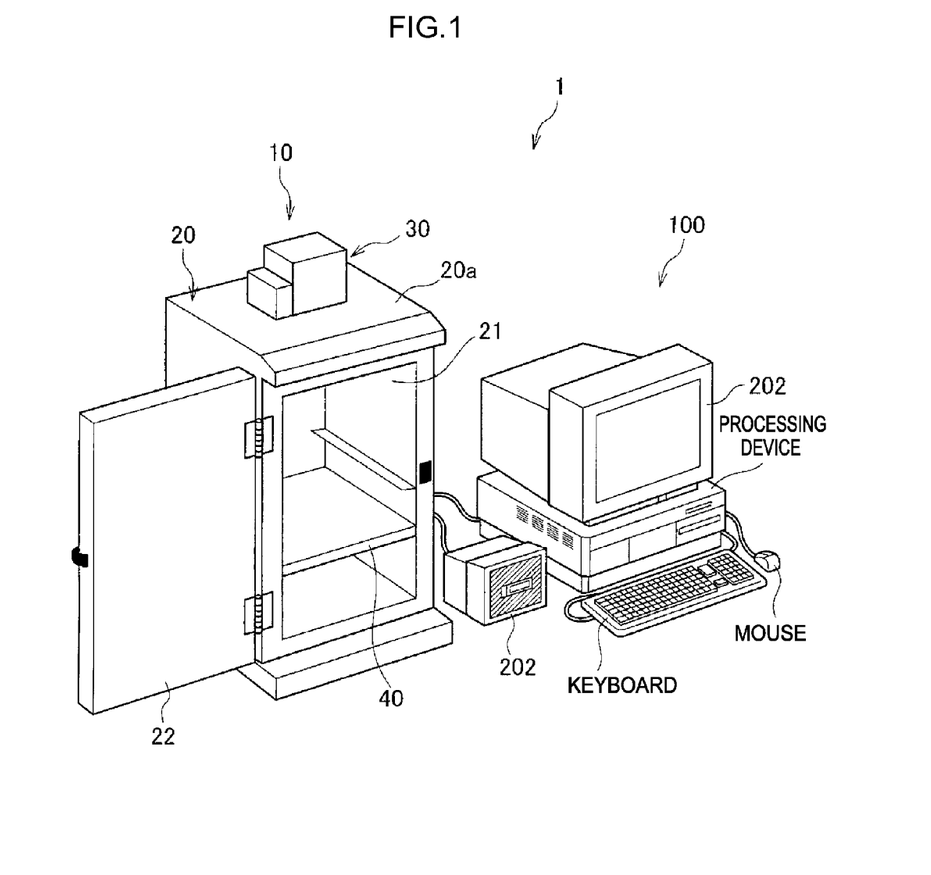
FIG. 1 is a perspective diagram of an imaging system.

FIG. 1 is a perspective diagram showing an example of an imaging system that utilizes an imaging apparatus relating to the present invention. The imaging system is an imaging system 1 that images an imaging subject by illuminating excitation light/not illuminating excitation light in accordance with the imaging subject and acquires a captured image of the imaging subject. The imaging system 1 includes an imaging apparatus 10 and an image processing device 100.

The imaging apparatus 10 images the imaging subject and outputs the acquired image data of the imaging subject to the image processing device 100. The image processing device 100 applies predetermined image processing to the received image data in accordance with requirements, and displays the image data at a display section 202.

Figure 2:
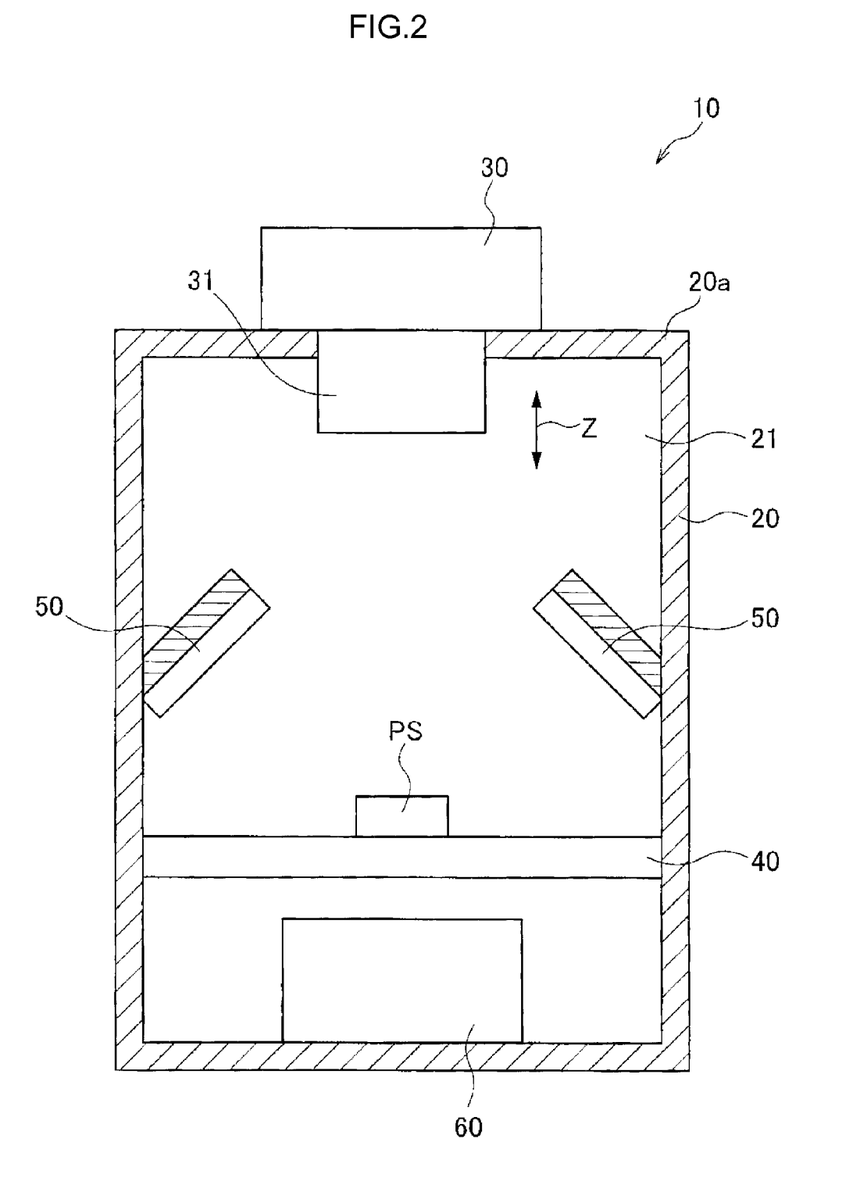
FIG. 2 is a front elevation diagram of an imaging apparatus.

FIG. 2 shows a front elevation diagram of the imaging apparatus 10 in a state in which a lid 22 (see FIG. 1) is open. As shown in FIG. 2, the imaging apparatus 10 is equipped with an imaging subject arrangement portion 40, a casing 20, an imaging section 30, epi-illumination light sources 50 and a transmission light source 60. An imaging subject PS is disposed on the imaging subject arrangement portion 40. The casing 20 accommodates the imaging subject arrangement portion 40 thereinside. The imaging section 30 images the imaging subject PS disposed at the imaging subject arrangement portion 40. The epi-illumination light sources 50 and the transmission light source 60 illuminate excitation light at the imaging subject PS, and are disposed inside the casing 20.

The casing 20 includes a cavity portion 21 formed in a substantially cuboid shape, and includes thereinside the imaging subject arrangement portion 40 on which the imaging subject PS is disposed. The lid 22 shown in FIG. 1 is mounted to the casing 20 to be openable and closable, and a user may open the lid 22 and accommodate the imaging subject PS inside the casing 20. Thus, the casing 20 structures a black box such that external light does not enter the cavity portion 21.

The imaging section 30 is fixed to an upper face 20a of the casing 20 and is described in detail below. The imaging section 30 includes, for example, an imaging device such as a CCD or the like. A cooling device is mounted at the imaging device and cools the imaging device. Thus, the inclusion of a noise component due to dark currents in captured image information is prevented.

A lens unit 31 is mounted at the imaging section 30. The lens unit 31 is provided to be movable in the direction of arrow Z, for focusing on the imaging subject PS.

The epi-illumination light sources 50 illuminate excitation light towards the imaging subject PS disposed on the imaging subject arrangement portion 40. The transmission light source 60 illuminates imaging light from below the imaging subject PS. If a fluorescent material is being imaged, excitation light is illuminated at the imaging subject from one or both of the epi-illumination light sources 50 and the transmission light source 60, depending on the imaging subject.

Figure 3:
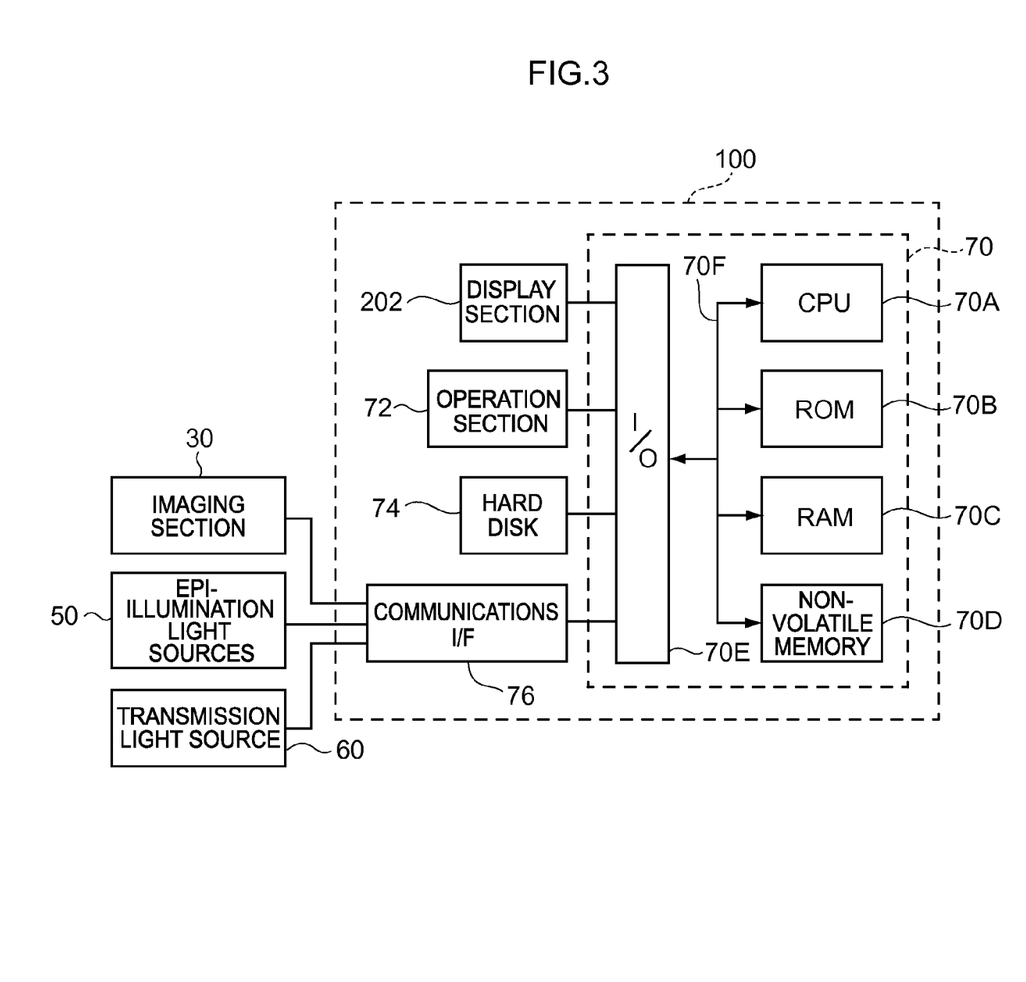
FIG. 3 is a schematic block diagram of an image processing device 100.

FIG. 3 shows general structure of the image processing device 100. As shown in FIG. 3, the image processing device 100 includes a main controller 70.

The main controller 70 is structured with a CPU (central processing unit) 70A, a ROM (read-only memory) 70B, a RAM (random access memory) 70C, A non-volatile memory 70D and an input/output interface (I/O) 70E that are connected to one another via a bus 70F.

The display section 202, an operation section 72, a hard disk 74 and a communications interface (I/F) 76 are connected to the I/O 70E. The main controller 70 performs overall control of these functional units.

The display section 202 is constituted with, for example, a cathode ray tube, a liquid crystal display device or the like. The display section 202 displays images captured by the imaging apparatus 10, and displays screens for applying various specifications and instructions to the imaging apparatus 10 and so forth.

The operation section 72 is constituted with a mouse and keyboard or the like. The operation section 72 is for a user to give various instructions to the imaging apparatus 10 by operating the operation section 72.

The hard disk 74 stores image data of captured images that have been imaged by the imaging apparatus 10, a control program that is described below, various data that are required for control, and so forth.

The communications interface 76 is connected with the imaging section 30, epi-illumination light sources 50 and transmission light source 60 of the imaging apparatus 10. The CPU 70A instructs the imaging section 30, via the communications interface 76, to capture images under imaging conditions according to types of imaging subject. In a case in which excitation light is to be illuminated at an imaging subject, the CPU 70A instructs the illumination of excitation light from one or both of the epi-illumination light sources 50 and the transmission light source 60, receives imaging data of a captured image that is imaged by the imaging section 30, and carries out image processing and the like.

Figure 4:
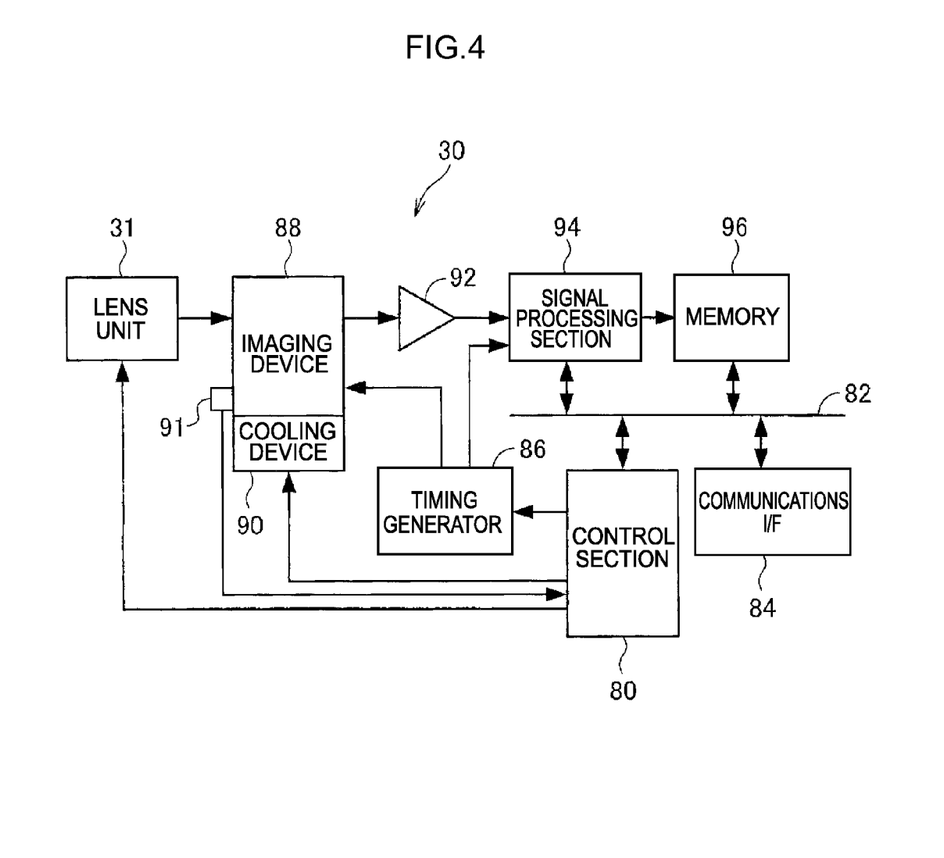
FIG. 4 is a schematic block diagram of an imaging section 30.

FIG. 4 shows general structure of the imaging section 30. As shown in FIG. 4, the imaging section 30 is equipped with a control section 80, and the control section 80 is connected with a communications interface (I/F) 84 via a bus 82. The communications interface 84 is connected with the communications interface 76 of the image processing device 100.

When an imaging instruction is received from the image processing device 100 via the communications interface 84, the control section 80 controls the respective sections in accordance with details of the instruction and images the imaging subject PS disposed on the imaging subject arrangement portion 40. The control section 80 transmits the image data of the captured image to the image processing device 100 via the communications interface 84.

The control section 80 is connected to the lens unit 31, a timing generator 86, a cooling device 90 that cools an imaging device 88, and a temperature sensor 91 that detects a temperature of the imaging device 88.

The control section 80 is constituted by a computer that includes, for example, a CPU, RAM, ROM, non-volatile ROM and the like, which are not shown in the drawings. The non-volatile ROM stores a control program that controls the respective sections. The respective sections connected to the control section 80 are controlled by this program being read out and executed by the CPU.

Although not shown in the drawings, the lens unit 31 includes, for example, a lens group formed of plural optical lenses, an aperture adjustment mechanism, a zoom mechanism, an automatic focus control mechanism and the like. The lens group is provided to be movable in the direction of arrow Z in FIG. 2 for focusing on the imaging subject PS. The aperture control mechanism alters the diameter of an aperture and adjusts incident light amounts on the imaging device 88. The zoom mechanism adjusts a position at which the lens is disposed and implements zooming. The automatic focus control mechanism adjusts the focusing point in accordance with a distance between the imaging subject PS and the imaging apparatus 10.

Light from the imaging subject PS passes through the lens unit 31 and is focused on the imaging device 88 as an image of the imaging subject.

As described in detail below, the imaging device 88 includes light detection portions corresponding with a plural number of pixels, a horizontal transfer path, vertical transfer paths and so forth. The imaging device 88 features a function of optoelectronically converting the imaging subject image that has been imaged at the imaging surface to electronic signals. For example, an image sensor such as a charge coupled device (CCD), a metal oxide semiconductor (MOS) sensor or the like is employed. In the present exemplary embodiment, a CCD is used as the imaging device 88.

The imaging device 88 is controlled by timing signals from the timing generator 86, and optoelectronically converts incident light from the imaging subject PS at the light detection portions.

The signal charges to which the light is optoelectronically converted by the imaging device 88 are voltage-converted by a charge-voltage conversion amplifier (a floating diffusion amplifier) 92 to analog signals, and are outputted to a signal processing section 94.

The timing generator 86 includes an oscillator that generates a basic clock signal (a system clock) that operates the imaging section 30. This basic clock is, for example, supplied to the respective sections and divided to generate various timing signals. For example, timing signals representing a vertical synchronization signal, a horizontal synchronization signal, electronic shutter pulses and the like are generated and supplied to the imaging device 88. Further timing signals—sampling pulses for correlated double sampling, a conversion clock for analog-to-digital conversion, and the like—are generated and supplied to the signal processing section 94.

The signal processing section 94 includes a correlated double sampling (CDS) circuit, an analog-to-digital (A/D) converter and the like. The CDS circuit is controlled by timing signals from the timing generator 86 and applies correlated double sampling processing to the inputted analog signals. The A/D converter converts the analog signals to which the correlated double sampling processing has been applied to digital signals.

In order to reduce noise and the like included in the imaging signals outputted from the imaging device 88, the correlated double sampling processing obtains pixel signals by taking differences between levels of the imaging signals in feed-through periods and levels in signal periods corresponding to image portions.

The pixel signals after the correlated double sampling processing are A/D-converted by the A-D converter, outputted to a memory 96 and temporarily stored. In the present exemplary embodiment, as described in detail below, because multiple sampling is performed in both the feed-through period and the signal period, plural sets of pixel data for one pixel are temporarily stored in the memory 96. The control section 80 calculates an average of the plural pixel data, and the average serves as pixel data. The control section 80 applies this processing to each pixel and sends image data, which is a collection of pixel data, to the image processing device 100 via the communications interface 84.

The cooling device 90 is constituted by, for example, a Peltier device or the like, and a cooling temperature thereof is controlled by the control section 80. If the imaging subject PS is a chemoluminescent material, the image is captured by image exposure being performed for a relatively long time without excitation light being illuminated. Correspondingly, the temperature of the imaging device 88 may rise and image quality may be adversely affected by an increase in dark currents and the like. Therefore, in the control section 80, the temperature of the imaging device 88 is maintained at a cooling temperature instructed by the image processing device 100. While the temperature of the imaging device 88 detected by the temperature sensor 91 is monitored, the cooling device 90 is controlled by pulse width modulation (PWM) to cool the imaging device 88.

Figure 5:
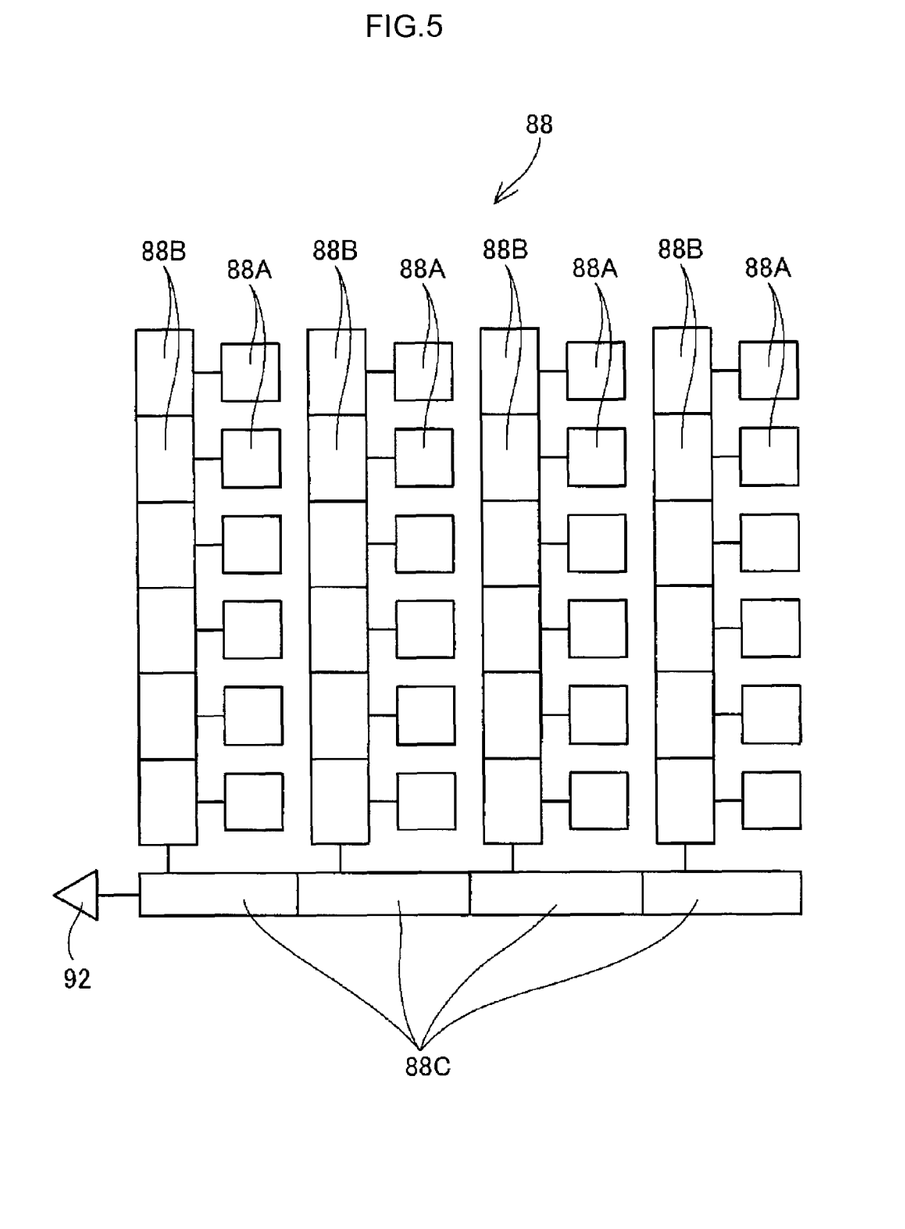
FIG. 5 is a diagram showing schematic structure of an imaging device.

FIG. 5 shows general structure of the imaging device 88 employing the CCD. The imaging device 88 includes light detection portions (photodiodes) 88A, which constitute pixels, vertical transfer paths 88B and a horizontal transfer path 88C.

Charges, to which light detected by the light detection portions 88A have been optoelectronically converted, are outputted to the vertical transfer path 88B in each column. The charges outputted to the vertical transfer path 88B in each column are respectively transferred to the horizontal transfer path 88C, and the charges respectively outputted to the horizontal transfer path 88C are sequentially transferred to the charge-voltage conversion amplifier 92.

The imaging device 88 is equipped with a pixel addition function. Pixel addition in the vertical direction is implemented at the horizontal transfer path 88C, and pixel addition in the horizontal direction is implemented at the charge-voltage conversion amplifier 92. In a case of a structure in which a summing gate is provided at an output stage of the horizontal transfer path 88C, the horizontal direction pixel addition may be implemented by the summing gate. In the present exemplary embodiment, however, a case in which pixel addition in the horizontal direction is implemented by the charge-voltage conversion amplifier 92 is described.

Next, as operation of the present exemplary embodiment, processing that is executed by the control section 80 of the imaging section 30 is described with reference to the flowchart shown in FIG. 6.

First, a user disposes an imaging subject PS on the imaging subject arrangement portion 40 and operates the operation section 72 to specify imaging conditions. At this time, for example, an imaging condition specification screen is displayed at the display section 202 and various imaging conditions are specified by the user. The imaging conditions include, for example, pixel addition numbers, an exposure duration and the like. The user specifies the imaging conditions and then instructs the start of imaging. When the start of imaging is instructed, the imaging conditions specified by the user are sent to the imaging section 30.

At the control section 80 of the imaging section 30, in step 100, a determination is made as to whether the imaging conditions have been received. If the imaging conditions have been received, the control section 80 proceeds to step 102. If the imaging conditions have not been received, the control section 80 waits.

In step 102, the control section 80 controls the timing generator 86 and the like so as to execute imaging in accordance with the imaging conditions. The timing generator 86 generates reset signals, vertical synchronization signals and horizontal synchronization signals and outputs the same to the imaging device 88 such that imaging signals are subjected to pixel addition in the specified pixel addition numbers. The timing generator 86 also outputs sampling signals to the CDS circuit of the signal processing section 94. If the horizontal direction pixel addition number is 2 or greater, the timing generator 86 also controls the pulse width of the horizontal synchronization signals such that, for performing multiple sampling, the feed-through period and the signal period are longer than in a case without pixel addition in the horizontal direction, and the timing generator 86 outputs sampling signals that include sampling pulses, with a number of samples N in accordance with the pixel addition number, to the CDS circuit of the signal processing section 94.

FIG. 7A to FIG. 7D show waveform diagrams of a reset signal and horizontal synchronization signals H1 and H2 that the timing generator 86 outputs to the imaging device 88, an imaging signal outputted from the imaging device 88, and a sampling signal outputted to the CDS circuit of the signal processing section 94. In FIG. 7A to FIG. 7D, a case of adding two pixels in the horizontal direction is illustrated as an example.

Figure 7A:
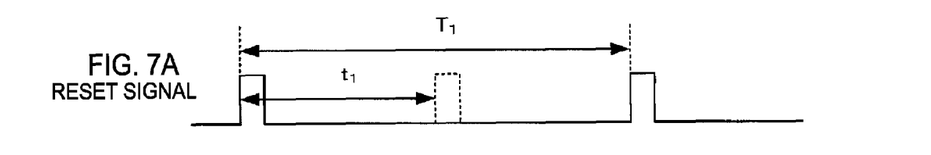
FIG. 7A to FIG. 7D are timing charts of signals relating to driving of the imaging device.

As shown in FIG. 7A for the reset signal, in a case in which pixel addition in the horizontal direction is not performed, reset pulses with an interval of $t_1$ are outputted (i.e., charges accumulated at the charge-voltage conversion amplifier 92 are reset at intervals of $t_1$). As also shown in FIG. 7A, in a case in which addition of two pixels in the horizontal direction is performed, the reset pulses are outputted with an interval of $T_1$, which is twice the interval in the case in which pixel addition is not performed, in order to perform pixel addition by skipping one cycle of resetting of the accumulated charges.

Figure 7B:
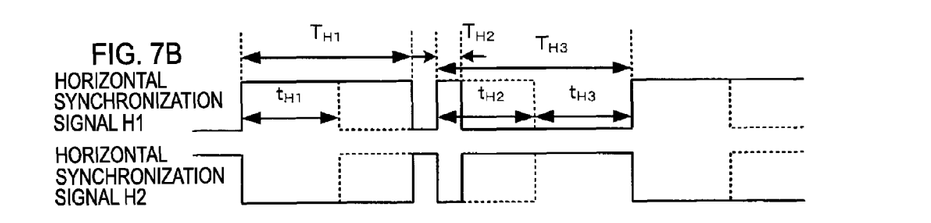

As shown in FIG. 7B, the horizontal synchronization signals H1 and H2 are signals with mutually opposite phases. In the case in which two pixels are added in the horizontal direction, a pulse width $T_{H1}$ of the horizontal synchronization signal H1, which goes to the high level synchronously with a reset pulse, is longer than a pulse width $t_{H1}$ in a case in which pixels are not added in the horizontal direction. The same applies to the horizontal synchronization signal H2.

Figure 7C:
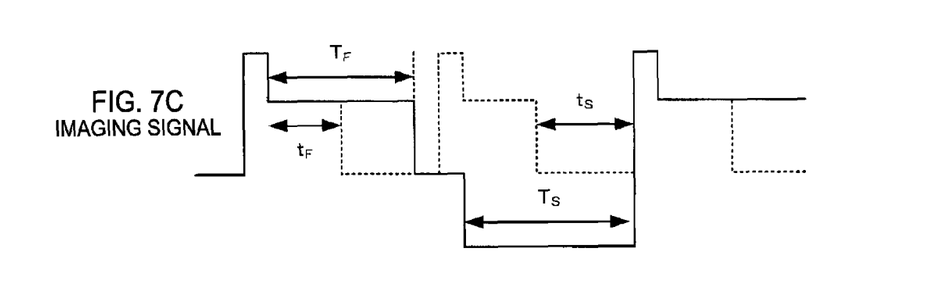
Figure 7D:
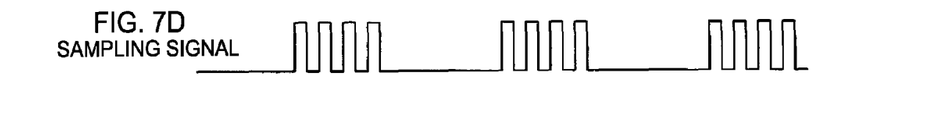

Hence, as shown in FIG. 7C, a feed-through period $T_F$ of the imaging signal in the case in which two pixels are added in the horizontal direction is longer than a feed-through period $t_F$ of the imaging signal in the case without pixel addition in the horizontal direction. As shown in FIG. 7D, N sampling pulses (four in this drawing) are outputted in the feed-through period $T_F$.

As shown in FIG. 7B, a pulse width $T_{H2}$ of the horizontal synchronization signal H1 after it briefly goes to the low level and then back to the high level, is shorter than a pulse width $T_{H2}$ in the case without pixel addition in the horizontal direction. Charges from a first pixel are transferred to the charge-voltage conversion amplifier 92 when a pulse with the pulse width $t_{H2}$ is outputted to the horizontal transfer path 88C. At this time, as shown in FIG. 7A, a reset pulse is not being outputted (illustrated by broken lines in the drawing). Therefore, charges accumulated at the charge-voltage conversion amplifier 92 are not reset but added to by the next charges that are transferred from the horizontal transfer path 88C.

As shown in FIG. 7B, because the pulse width $T_{H2}$ is shorter than the pulse width $T_{H2}$ of the case without pixel addition in the horizontal direction, a period $T_{H3}$ when the horizontal synchronization signal H1 is subsequently at the low level is longer than a period $t_{H3}$ of the case without pixel addition in the horizontal direction.

Hence, as shown in FIG. 7C, a signal period $T_S$ of the imaging signals in the case in which two pixels are added in the horizontal direction is longer than a signal period $t_S$ of imaging signals in the case without pixel addition in the horizontal direction. As shown in FIG. 7D, N sampling pulses (four in this drawing) are outputted in the signal period $T_S$.

It is preferable if the pulse width $T_{H2}$ is specified with a minimum duration that is long enough that transfer efficiency of the imaging device 88 is not impaired. Hence, the feed-through period $T_F$ and the signal period $T_S$ may be set to maximum lengths.

Thus, in a case in which pixel addition in the horizontal direction is performed, the pulse widths of the horizontal synchronization signals H1 and H2 are controlled such that the feed-through period and the signal period are longer than in a case in which pixel addition is not performed, and multiple sampling may be performed in the feed-through period and signal period.

Random noise may be reduced further by increasing the number of samples N. Therefore, it is preferable to set the number of samples N as large as possible in accordance with the lengths of the feed-through period $T_F$ and signal period $T_S$. Note that, with an increase in the pixel addition number in the horizontal direction, the number of pulses with the pulse width $T_{H2}$ increases and the feed-through period $T_F$ and signal period $T_S$ are shortened correspondingly, and therefore, the number of samples N is reduced.

Because N samples are taken in each of the feed-through period $T_F$ and the signal period $T_S$, N sets of pixel data are temporarily stored in the memory 96 for each pixel.

Accordingly, in step 104, an average value A and a standard deviation σ of N multiply sampled sets of pixel data $D_1$ to $D_N$ are calculated.

In step 106, a determination is made as to whether there is any data outside a predetermined range among the N sets of pixel data $D_1$ to $D_N$. Specifically, as an example in the present exemplary embodiment, the predetermined range is A±3σ. In other words, for each of the sets of pixel data $D_1$ to $D_N$, a determination is made as to whether the pixel data has a value outside the range A±3σ.

If there is any data outside the predetermined range among the N sets of pixel data $D_1$ to $D_N$, the control section 80 proceeds to step 108, but if there is not, the control section 80 proceeds to step 110.

In step 108, the control section 80 re-calculates the average A of the pixel data, excluding the pixel data that is outside the predetermined range.

In step 110, the calculated average is stored in the memory 96 to serve as the pixel data of the pixel.

Thus, by average values of pixel data excluding pixel data outside the predetermined range being set as pixel data, accurate pixel data from which the effects of noise are removed may be obtained.

In step 112, a determination is made as to whether the above processing, the processing of steps 104 to 108, has been executed for all pixels. If the above processing has been completed for all pixels, the control section 80 proceeds to step 114, but if the above processing has not been completed for all pixels, the control section 80 returns to step 104 and executes the above processing again.

In step 114, the pixel data stored in the memory 96 is outputted to the image processing device 100 as image data.

Thus, in the present exemplary embodiment, in a case in which pixel addition in the horizontal direction is performed, pulse widths of the horizontal synchronization signals are controlled such that the feed-through period $T_F$ and signal period $T_S$ are longer than in a case in which pixel addition is not performed. Therefore, multiple sampling may be performed without lengthening the pixel transfer interval $T_1$, and random noise and the like may be reduced.

A low pass filter that applies low pass processing to the imaging signals may be provided at the signal processing section 94. Thus, the waveforms of imaging signals may be smoothed. Therefore, noise may be reduced and accurate pixel data may be obtained. Accordingly, in such a case, sampling may be performed only once in the feed-through period $T_F$ and signal period $T_S$ rather than multiple sampling.

Further, in the present exemplary embodiment, the number of samples N may be specified on the basis of the standard deviation σ of pixel data. When the standard deviation σ is smaller, variations in the pixel data are smaller. Correspondingly, there is no need for the number of samples N to be large. Therefore, for example, the number of samples N is specified to be smaller when the standard deviation σ is smaller. Hence, because there is no need to make the number of samples N larger than necessary, if the pulse widths of the horizontal synchronization signals are controlled so as to shorten the feed-through period $T_F$ and signal period $T_S$ in accordance with the number of samples N, the pixel transfer interval $T_1$ may be shortened, and a pixel data reading time may be shortened.

Figure 6:
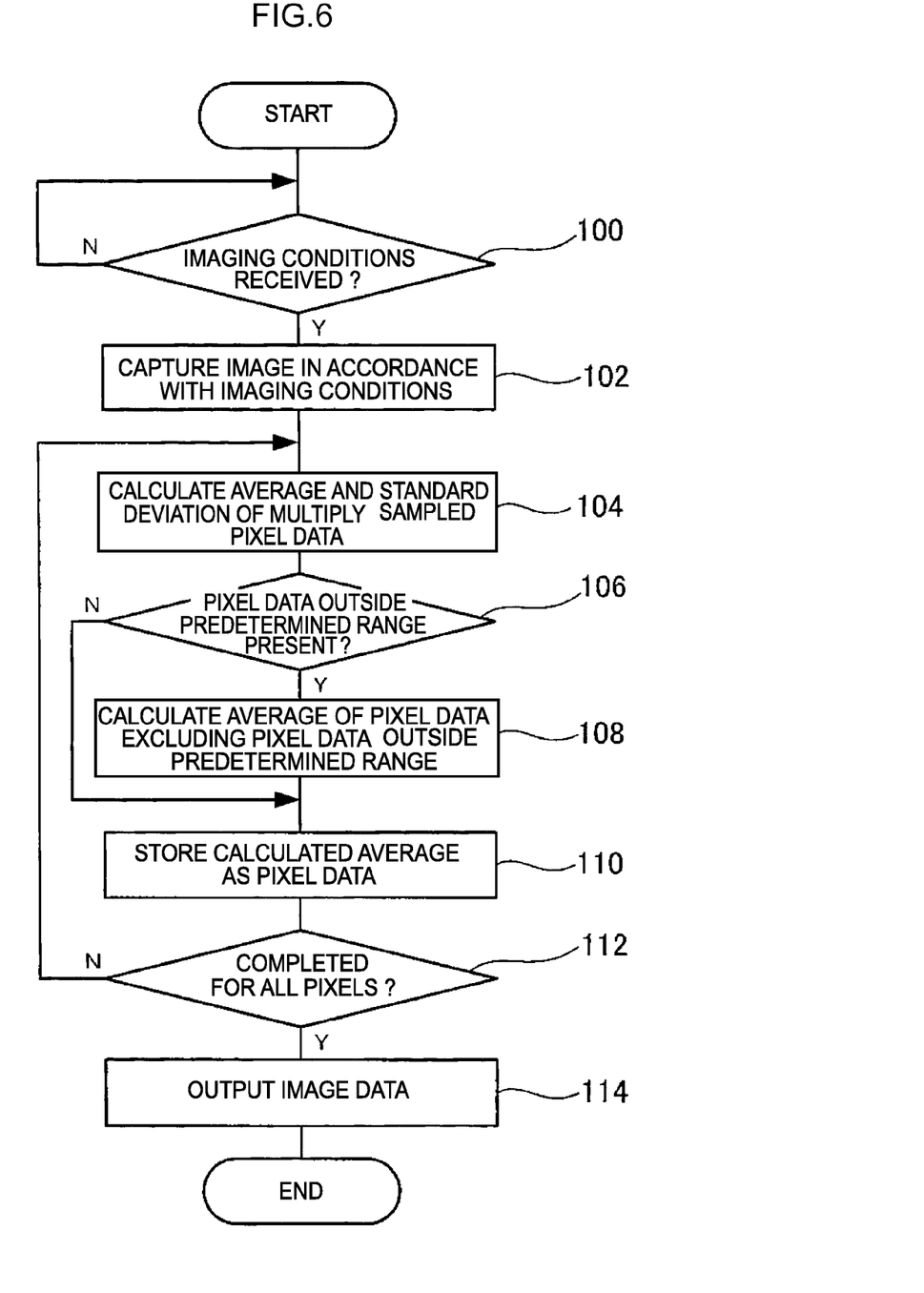
FIG. 6 is a flowchart of a control routine executed by a CPU of the imaging section.

In the present exemplary embodiment, a case is described in which the control section 80 of the imaging section 30 executes the processing of FIG. 6. However, a signal processing circuit that executes the processing of steps 104 to 112 may be provided at the signal processing section 94, and the processing executed at this signal processing circuit.

The constitution of the imaging system 1 described in the present exemplary embodiment (see FIG. 1 to FIG. 4) is an example, and it will be clear that unnecessary portions may be removed and new portions may be added within a scope not departing from the spirit of the present invention.

The flow of processing of the control program described in the present exemplary embodiment (see FIG. 6) is also an example, and it will be clear that unnecessary steps may be removed, new steps may be added, and the processing sequence may be rearranged within a scope not departing from the spirit of the present invention.

According to a first aspect of the invention, there is provided an imaging apparatus including: an imaging device that images an imaging subject, pixels of the imaging device being arrayed in two dimensions and the imaging device being equipped with a pixel addition function that performs pixel addition of a plurality of pixels in a horizontal direction; a control unit that controls a pulse width of horizontal synchronization signals outputted to the imaging device, such that a feed-through period and a signal period, in a case in which pixel addition in the horizontal direction is performed at the imaging device and imaging signals are outputted, are longer than a feed-through period and a signal period, in a case in which pixel addition in the horizontal direction is not performed at the imaging device; a noise reduction processing unit that executes noise reduction processing, which utilizes the fact of the feed-through period and the signal period, in the case in which pixel addition in the horizontal direction is performed, being longer than the feed-through period and the signal period, in the case in which pixel addition in the horizontal direction is not performed, to reduce effects of noise produced in the imaging signals; and a pixel value calculation unit that calculates a pixel value on the basis of a first signal sampled in the feed-through period, and a second signal sampled in the signal period.

According to the structure described above, the pulse widths of the horizontal synchronization signals outputted to the imaging device are controlled such that the feed-through period and signal period, in a case in which pixels are added in the horizontal direction in the imaging device and imaging signals are outputted, are longer than the feed-through period and signal period, in a case in which pixels are not added in the horizontal direction in the imaging device. The noise reduction processor utilizes the fact that the feed-through period and signal period, in the case with pixel addition in the horizontal direction, are longer than the feed-through period and signal period, in the case without pixel addition in the horizontal direction, to apply noise reduction processing to reduce the effects of noise produced in the imaging signals. Thus, using multiple sampling as a noise reduction process or the like is possible, and random noise and the like may be reduced at times of pixel addition.

In a second aspect of the present invention, in the first aspect, the noise reduction processing unit may include a multiple sampling unit that performs multiple sampling in the feed-through period and the signal period in a case in which pixel addition of a plurality of pixels in the horizontal direction is performed, and, in the case in which pixel addition of a plurality of pixels in the horizontal direction is performed, the pixel value calculation unit may calculate the pixel value on the basis of a plurality of first signals multiply sampled in the feed-through period, and a plurality of second signals multiply sampled in the signal period.

According to a third aspect of the present invention, in the first aspect, the pixel value calculation unit may include: a correlated double sampling unit that outputs a difference between a first signal sampled in the feed-through period and a second signal sampled in the signal period as a pixel signal; a timing signal generation unit that outputs timing signals to the correlated double sampling unit such that multiple sampling is performed in both the feed-through period and the signal period; an A/D conversion unit that A/D-converts the respective pixel signals outputted from the correlated double sampling unit; and an average value calculation unit that calculates an average value of a plurality of pixel data to which the respective pixel signals have been A/D-converted by the A/D conversion unit.

According to a fourth aspect of the present invention, in the third aspect, the average value calculation unit may calculate the average value of the plurality of pixel data, excluding pixel data outside a predetermined range that is set on the basis of a standard deviation of the plurality of pixel data.

According to a fifth aspect of the present invention, in the fourth aspect, the predetermined range may be A±3σ, where the average value of the plurality of pixel data is represented by A and the standard deviation is represented by σ.

According to a sixth aspect of the present invention, in any of the third to fifth aspects, the imaging apparatus may further include a setting unit that sets a number of samples of the multiple sampling on the basis of a standard deviation of the plurality of pixel data.

According to a seventh aspect of the present invention, in the sixth aspect, the setting unit may set the number of samples of the multiple sampling such that the smaller the standard deviation is, the smaller the number of samples is, and the control unit may control the pulse width of the horizontal synchronization signals outputted to the imaging device such that the feed-through period and the signal period are shortened in accordance with the number of samples.

According to an eighth aspect of the present invention, in any of the second to seventh aspects, the imaging apparatus may further include a low pass filter that applies low pass processing to the imaging signals.

According to a ninth aspect of the present invention, in the first aspect, the noise reduction processing unit may include a low pass filter that applies low pass processing to the imaging signals and a sampling unit that performs sampling once in the feed-through period and the signal period, and the pixel value calculation unit may calculate the pixel value on the basis of a first signal sampled once in the feed-through period from the imaging signals subsequent to the low pass processing, and a second signal sampled once in the signal period from the imaging signals subsequent to the low pass processing.

According to a tenth aspect of the invention, there is provided a program causing a computer to function as each of the units of the imaging apparatus according to any one of the first to ninth aspect.

According to an eleventh aspect of the invention, there is provided an imaging method including: controlling a pulse width of horizontal synchronization signals outputted to an imaging device that images an imaging subject, pixels of the imaging device being arrayed in two dimensions and the imaging device being equipped with a pixel addition function that performs pixel addition of a plurality of pixels in a horizontal direction, such that a feed-through period and a signal period, in a case in which pixel addition in the horizontal direction is performed at the imaging device and imaging signals are outputted, are longer than a feed-through period and a signal period, in a case in which pixel addition in the horizontal direction is not performed at the imaging device; executing noise reduction processing, which utilizes the fact of the feed-through period and the signal period, in the case in which pixel addition in the horizontal direction is performed, being longer than the feed-through period and the signal period, in the case in which pixel addition in the horizontal direction is not performed, to reduce effects of noise produced in the imaging signals; and calculating a pixel value on the basis of a first signal sampled in the feed-through period and a second signal sampled in the signal period.

According to the present invention, noise at times of pixel addition may be reduced.

Embodiments of the present invention are described above, but the present invention is not limited to the embodiments as will be clear to those skilled in the art.

What is claimed is:
1. An imaging apparatus comprising:
an imaging device that is configured to image an imaging subject, pixels of the imaging device being arrayed in two dimensions and the imaging device being equipped with a pixel addition function that performs pixel addition of a plurality of pixels in a horizontal direction;
a controller that is configured to control a pulse width of horizontal synchronization signals outputted to the imaging device, such that a feed-through period and a signal period, in a case in which pixel addition in the horizontal direction is performed at the imaging device and imaging signals are outputted, are longer than a feed-through period and a signal period, in a case in which pixel addition in the horizontal direction is not performed at the imaging device;
a noise reduction processor that is configured to execute noise reduction processing, which utilizes the fact of the feed-through period and the signal period, in the case in which pixel addition in the horizontal direction is performed, being longer than the feed-through period and the signal period, in the case in which pixel addition in the horizontal direction is not performed, by performing multiple sampling in the feed-through period and the signal period in the case in which pixel addition of a plurality of pixels in the horizontal direction is performed to reduce effects of noise produced in the imaging signals; and
a pixel value calculator configured to calculate a pixel value on the basis of a first signal sampled in the feed-through period, and a second signal sampled in the signal period.

2. The imaging apparatus according to claim 1, wherein in the case in which pixel addition of a plurality of pixels in the horizontal direction is performed, the pixel value calculator calculates the pixel value on the basis of a plurality of first signals multiply sampled in the feed-through period, and a plurality of second signals multiply sampled in the signal period.

3. The imaging apparatus according to claim 2, wherein the pixel value calculator comprises:
a correlated double sampler that is configured to output a difference between a first signal sampled in the feed-through period and a second signal sampled in the signal period as a pixel signal;
a timing signal generator that is configured to output timing signals to the correlated double sampler such that multiple sampling is performed in both the feed-through period and the signal period;
an A/D converter that is configured to A/D convert the respective pixel signals outputted from the correlated double sampler; and
an average value calculator that is configured to calculate an average value of a plurality of pixel data to which the respective pixel signals have been A/D-converted by the A/D converter.

4. The imaging apparatus according to claim 3, wherein the average value calculator calculates the average value of the plurality of pixel data, excluding pixel data outside a predetermined range that is set on the basis of a standard deviation of the plurality of pixel data.

5. The imaging apparatus according to claim 4, wherein the predetermined range is $A \pm 3\sigma$, where the average value of the plurality of pixel data is represented by A and the standard deviation is represented by $\sigma$.

6. The imaging apparatus according to claim 3, further comprising a setting processor that is configured to set a number of samples of the multiple sampling on the basis of a standard deviation of the plurality of pixel data.

7. The imaging apparatus according to claim 6, wherein
the setting processor is configured to set the number of samples of the multiple sampling such that the smaller the standard deviation is, the smaller the number of samples is, and
the controller is configured to control the pulse width of the horizontal synchronization signals outputted to the imaging device such that the feed-through period and the signal period are shortened in accordance with the number of samples.

8. The imaging apparatus according to claim 2, further comprising a low pass filter that applies low pass processing to the imaging signals.

9. The imaging apparatus according to claim 1, wherein
the noise reduction a low pass filter that applies low pass processing to the imaging signals and a sampler that is configured to perform sampling once in the feed-through period and the signal period, and
the pixel value calculator calculates the pixel value on the basis of a first signal sampled once in the feed-through period from the imaging signals subsequent to the low pass processing, and a second signal sampled once in the signal period from the imaging signals subsequent to the low pass processing.

10. A non-transitory computer readable medium storing a program causing a computer to execute image processing, the image processing comprising:
controlling a pulse width of horizontal synchronization signals outputted to an imaging device that images an imaging subject, pixels of the imaging device being arrayed in two dimensions and the imaging device being equipped with a pixel addition function that performs pixel addition of a plurality of pixels in a horizontal direction, such that a feed-through period and a signal period, in a case in which pixel addition in the horizontal direction is performed at the imaging device and imaging signals are outputted, are longer than a feed-through period and a signal period, in a case in which pixel addition in the horizontal direction is not performed at the imaging device;
executing noise reduction processing, which utilizes the fact of the feed-through period and the signal period, in the case in which pixel addition in the horizontal direction is performed, being longer than the feed-through period and the signal period, in the case in which pixel addition in the horizontal direction is not performed, by performing multiple sampling in the feed-through period and the signal period in the case in which pixel addition of a plurality of pixels in the horizontal direction is performed to reduce effects of noise produced in the imaging signals; and
calculating a pixel value on the basis of a first signal sampled in the feed-through period and a second signal sampled in the signal period.

11. The non-transitory computer readable medium according to claim 10, wherein
the calculating the pixel value further comprises, in the case in which pixel addition of a plurality of pixels in the horizontal direction is performed, calculating the pixel value on the basis of a plurality of first signals multiply sampled in the feed-through period, and a plurality of second signals multiply sampled in the signal period.

12. The non-transitory computer readable medium according to claim 11, wherein the calculating the pixel value further comprises:
outputting a difference between a first signal sampled in the feed-through period and a second signal sampled in the signal period as a pixel signal;
outputting timing signals such that multiple sampling is performed in both the feed-through period and the signal period;
A/D-converting the respective outputted pixel signals; and
calculating an average value of a plurality of pixel data to which the respective pixel signals have been A/D-converted.

13. The non-transitory computer readable medium according to claim 12, wherein the calculating the average value further comprises calculating the average value of the plurality of pixel data, excluding pixel data outside a predetermined range that is set on the basis of a standard deviation of the plurality of pixel data.

14. The non-transitory computer readable medium according to claim 13, wherein the predetermined range is $A \pm 3\sigma$, where the average value of the plurality of pixel data is represented by A and the standard deviation is represented by $\sigma$.

15. The non-transitory computer readable medium according to claim 12, wherein the imaging processing further comprises setting a number of samples of the multiple sampling on the basis of a standard deviation of the plurality of pixel data.

16. The non-transitory computer readable medium according to claim 15, wherein
the setting the number of samples further comprises setting the number of samples of the multiple sampling such that the smaller the standard deviation is, the smaller the number of samples is, and
the controlling the pulse width of horizontal synchronization signals further comprises controlling the pulse width of the horizontal synchronization signals outputted to the imaging device such that the feed-through period and the signal period are shortened in accordance with the number of samples.

17. The non-transitory computer readable medium according to claim 11, wherein the imaging processing further comprises applying low pass processing to the imaging signals.

18. The non-transitory computer readable medium according to claim 10, wherein
the executing noise reduction processing further comprises applying low pass processing to the imaging signals and performing sampling once in the feed-through period and the signal period, and
the calculating the pixel value further comprises calculating the pixel value on the basis of a first signal sampled once in the feed-through period from the imaging signals subsequent to the low pass processing, and a second signal sampled once in the signal period from the imaging signals subsequent to the low pass processing.

19. An imaging method comprising:
controlling a pulse width of horizontal synchronization signals outputted to an imaging device that images an imaging subject, pixels of the imaging device being arrayed in two dimensions and the imaging device being equipped with a pixel addition function that performs pixel addition of a plurality of pixels in a horizontal direction, such that a feed-through period and a signal period, in a case in which pixel addition in the horizontal direction is performed at the imaging device and imaging signals are outputted, are longer than a feed-through period and a signal period, in a case in which pixel addition in the horizontal direction is not performed at the imaging device;
executing noise reduction processing, which utilizes the fact of the feed-through period and the signal period, in the case in which pixel addition in the horizontal direction is performed, being longer than the feed-through period and the signal period, in the case in which pixel addition in the horizontal direction is not performed, by performing multiple sampling in the feed-through period and the signal period in the case in which pixel addition of a plurality of pixels in the horizontal direction is performed to reduce effects of noise produced in the imaging signals; and calculating a pixel value on the basis of a first signal sampled in the feed-through period and a second signal sampled in the signal period.

* * * * *